United States Patent
Farkash et al.

(10) Patent No.: US 9,911,003 B2
(45) Date of Patent: Mar. 6, 2018

(54) DYNAMIC DATA MASKING OF POST-OUTPUT DATABASE DATA

(71) Applicant: International Business Machines Corporation, Armonk, NY (US)

(72) Inventors: Ariel Farkash, Shimshit (IL); Igor Gokhman, Haifa (IL); Sivan Rabinovich, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/929,349

(22) Filed: Nov. 1, 2015

(65) Prior Publication Data
US 2017/0169245 A1    Jun. 15, 2017

(51) Int. Cl.
*G06F 21/62* (2013.01)
*G06F 17/30* (2006.01)

(52) U.S. Cl.
CPC .... *G06F 21/6227* (2013.01); *G06F 17/30569* (2013.01); *G06F 21/6254* (2013.01)

(58) Field of Classification Search
CPC .......... G06F 21/6227; G06F 17/30569; G06F 21/6254
USPC .............................................. 726/26
See application file for complete search history.

(56) References Cited

U.S. PATENT DOCUMENTS

| | | | |
|---|---|---|---|
| 7,958,267 B1* | 6/2011 | Eiras | G06F 9/541 709/224 |
| 8,024,339 B2 | 9/2011 | Barker et al. | |
| 2012/0197919 A1 | 8/2012 | Chen et al. | |
| 2012/0246696 A1* | 9/2012 | Boukobza | G06F 21/6227 726/1 |
| 2013/0144901 A1* | 6/2013 | Ho | G06F 17/30498 707/769 |
| 2014/0283127 A1* | 9/2014 | Chacko | G06F 21/606 726/28 |
| 2014/0304298 A1 | 10/2014 | Ho et al. | |
| 2015/0007249 A1 | 1/2015 | Bezzi et al. | |

* cited by examiner

*Primary Examiner* — Kambiz Zand
*Assistant Examiner* — Aubrey Wyszynski
(74) *Attorney, Agent, or Firm* — Dan Swirsky

(57) ABSTRACT

Dynamic data masking by intercepting data derived from a database, creating a tabular representation of the data, and masking any of the data in accordance with a masking policy that specifies which of the data are to be masked if a masking condition is met, where the masking condition references the tabular representation of the data using a tabular positional reference.

14 Claims, 3 Drawing Sheets

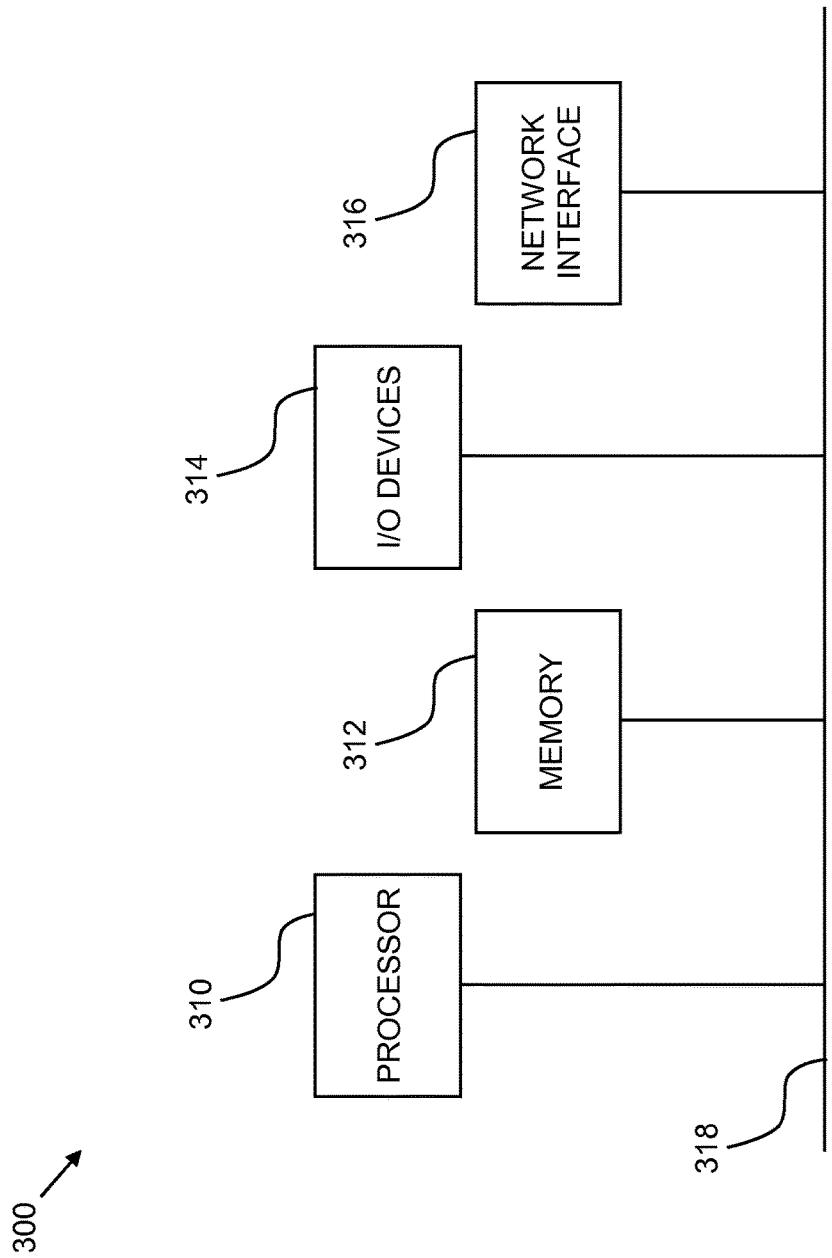

DYNAMIC DATA MASKING OF POST-OUTPUT DATABASE DATA

BACKGROUND

Dynamic data masking refers to securing data in real time by masking sensitive data as it is accessed, such that sensitive information is not provided to unauthorized recipients. Thus, for example, when a database query is received from an unauthorized or restricted user or application, dynamic data masking may be employed to mask some or all of the data so that sensitive data are not exposed to the requestor. In some dynamic data masking approaches data queries are analyzed and modified to cause data that are retrieved as a result of such queries to be masked. In other approaches rules are defined at the database level that specify specific tables and columns to be masked in anticipation of queries.

SUMMARY

In one aspect of the invention a method is provided for dynamic data masking, the method including intercepting data derived from a database, creating a tabular representation of the data, and masking any of the data in accordance with a masking policy that specifies which of the data are to be masked if a masking condition is met, where the masking condition references the tabular representation of the data using a tabular positional reference.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION

Figure 1:
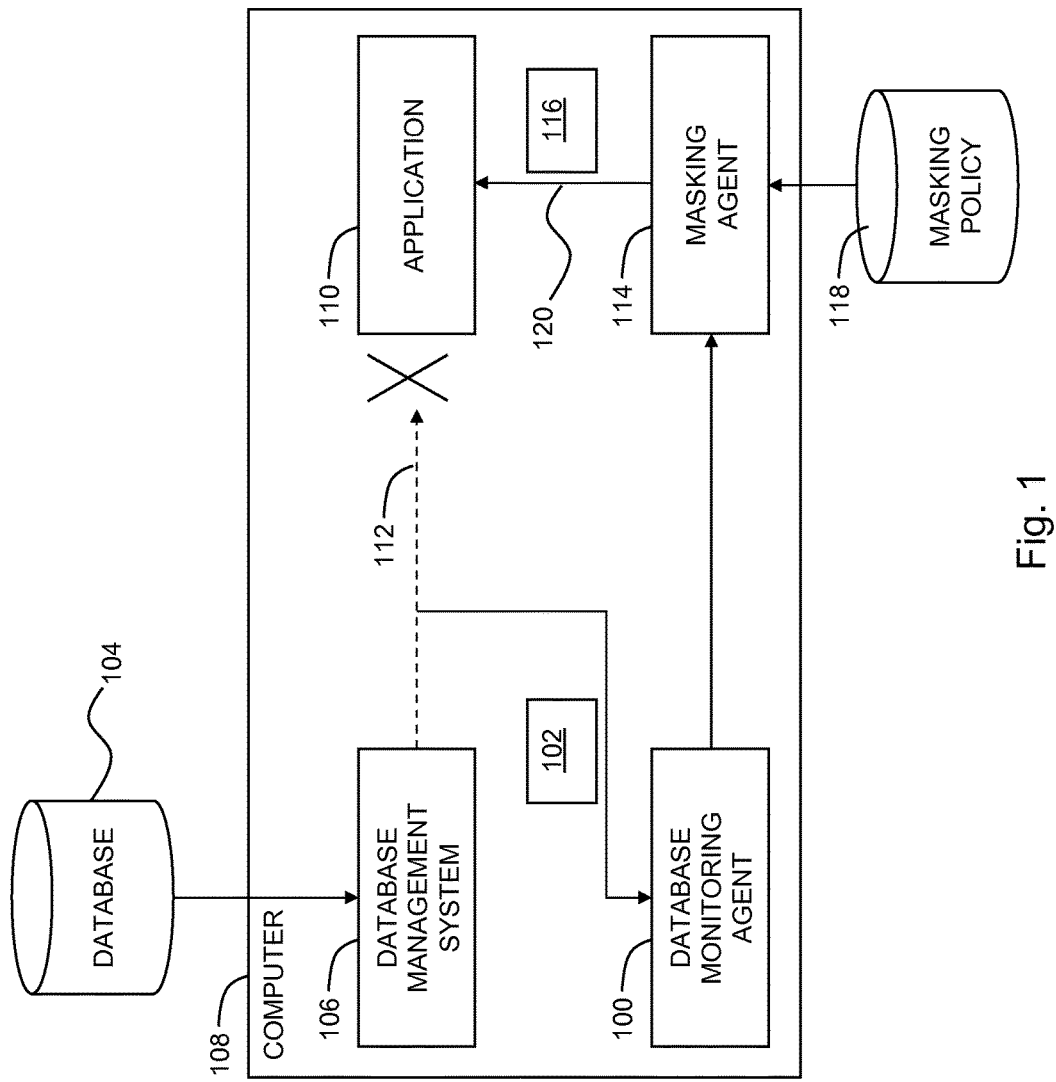
FIG. 1 is a simplified conceptual illustration of a dynamic data masking system, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified conceptual illustration of a data security system, constructed and operative in accordance with an embodiment of the invention. In the system of FIG. 1, a database monitoring agent 100, such as GUARDIUM S-TAP, commercially available from International Business Machines Incorporated of Armonk, N.Y., U.S.A., is configured to intercept data 102 that are derived from a database 104. Data 102 may, for example, be derived from database 104 by a database management system (DBMS) 106 that is hosted by a computer 108. Data 102 may, for example, be derived in response to a query received from a computer user or a software application, such as an application 110 that is hosted by computer 108 or by a computer other than computer 108 (not shown). Database monitoring agent 100 is configured to intercept data 102 after data 102 are derived from database 104 and before data 102 are provided to any recipient to which data 102 are intended to be sent, such as where database monitoring agent 100 intercepts data 102 that are found within a data stream 112 that is created by DBMS 106 for delivery to application 110, and thereby prevents data 102 from being delivered to the intended recipient pending the processing of data 102 as described hereinbelow. In one embodiment, database monitoring agent 100 is hosted by computer 108, data 102 are derived by computer 108 from database 104, and thus database monitoring agent 100 intercepts data 102 on computer 108. In another embodiment, database monitoring agent 100 is hosted by a computer other than computer 108 (not shown).

A masking engine 114, such as is implemented in GUARDIUM FOR APPLICATIONS, commercially available from International Business Machines Incorporated of Armonk, N.Y., U.S.A., is configured to process data 102 after data 102 are intercepted by database monitoring agent 100, as follows. Masking engine 114 creates a tabular representation 116 of data 102 in accordance with conventional techniques where data 102 are in a non-tabular format. For example, data parsing techniques such as are employed by JAVA DATABASE CONNECTIVITY TECHNOLOGY (JDBC), commercially available from Oracle Corporation of Redwood Shores, Calif., may be used. Masking engine 114 then masks any of the data in tabular representation 116 by applying one or more predefined masking policies 118. Each masking policy 118 specifies which of the data in tabular representation 116 are to be masked if a masking condition is met, where the masking condition references tabular representation 116 using one or more tabular positional references. A tabular positional reference is defined herein as a reference that specifies one or more rows and/or columns of tabular representation 116. Masking engine 114 masks any of the data in tabular representation 116 using any masking technique, such as by replacing any of the data in tabular representation 116 with randomly-selected characters, or with predefined characters such as asterisks. Masking engine 114 may then provide the data from tabular representation 116, including any masked data from tabular representation 116, to any recipient to which data 102 were originally intended to be provided, such as to application 110, and in any suitable format, such as in a data stream 120.

Any of the elements shown in FIG. 1 that are hosted by a computer are preferably implemented in computer hardware in computer hardware and/or in computer software embodied in a non-transitory, computer-readable medium in accordance with conventional techniques.

Figure 2:
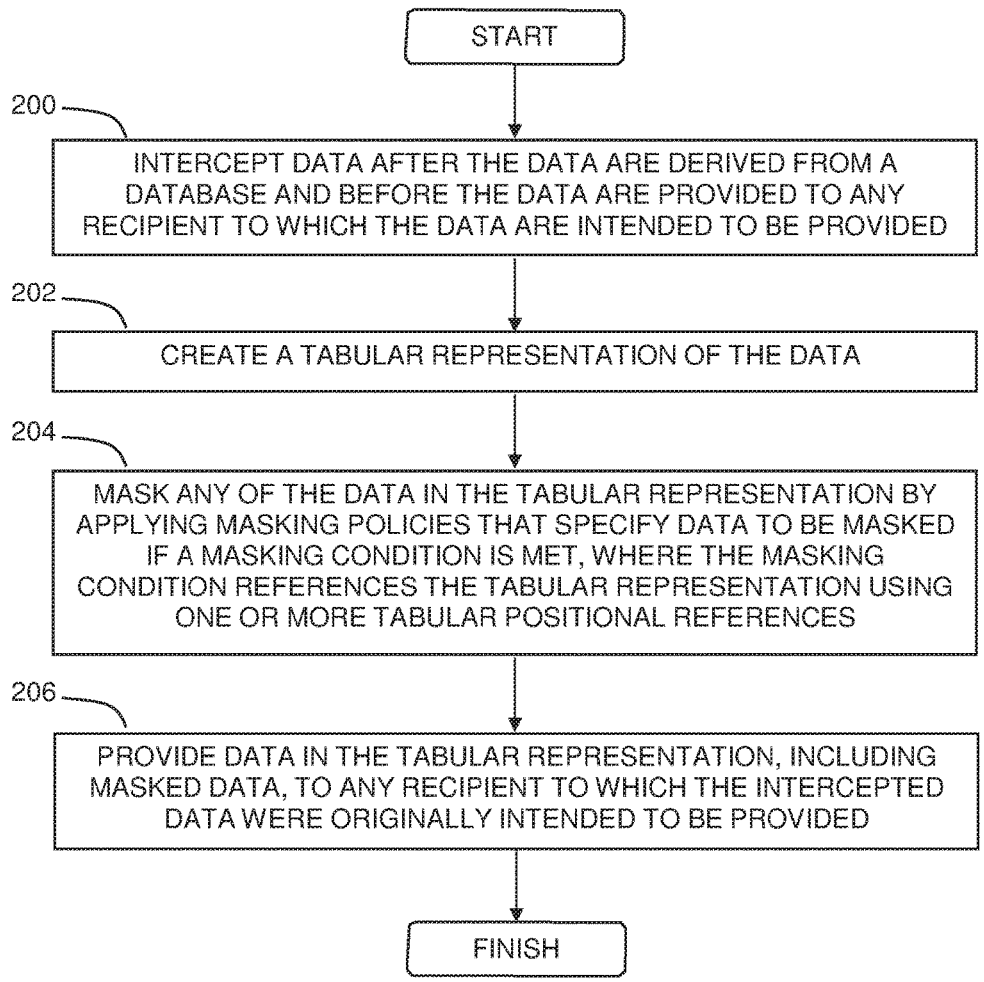
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2 data are intercepted after the data are derived from a database and before the data are provided to any recipient to which the data are intended to be provided (step 200). A tabular representation of the data is created (step 202). Any of the data in the tabular representation are masked by applying one or more predefined masking policies, where each masking policy specifies which of the data in the tabular representation are to be masked if a masking condition is met, and where the masking condition references the tabular representation using one or more tabular positional references (step 204). The data from the tabular representation, including any masked data from the tabular representation, are provided to any recipient to which the intercepted data were originally intended to be provided (step 206).

Operation of the system of FIG. 1 and the method of FIG. 2 may be illustrated with reference to the following examples of predefined masking policies that may be used to mask data that are intercepted after the data are derived from a database and before the data are provided to any recipient to which the data are intended to be provided. Once a tabular representation of the intercepted data is created, data within the tabular representation may be masked according to any of the following masking policies:

mask all data in the third column;

mask anything that looks like a telephone number in the third column (e.g., that is in the format nnn-nnn-nnnn, where n is a number);

if the data present in the second column of a row is found in predefined blacklist, mask or remove the entire row.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A dynamic data masking method comprising:
   intercepting data derived by a computer-hosted database management system from a database,
      wherein the data are intercepted when the data are found within a data stream created by the database management system for delivery to a computer-hosted application, and
      wherein the intercepted data are in a non-tabular format;
   creating a tabular representation of the intercepted data; and
   masking any of the data in accordance with a masking policy that specifies which of the data in the tabular representation of the intercepted data are to be masked if a masking condition is met, wherein the masking condition references the tabular representation of the intercepted data using a tabular positional reference that refers to any of a row and a column of the tabular representation of the intercepted data.

2. The method according to claim 1 wherein the intercepting comprises intercepting
   a) after the data are derived from the database and
   b) before the data are provided to a recipient.

3. The method according to claim 2 wherein the intercepting comprises intercepting the data on a computer that derives the data from the database.

4. The method according to claim 2 wherein the intercepting comprises intercepting wherein the data are derived from the database in response to a query.

5. The method of claim 1 wherein the intercepting, creating, and masking are implemented in any of
   a) computer hardware, and
   b) computer software embodied in a non-transitory, computer-readable medium.

6. A dynamic data masking system comprising:
   a database monitoring agent configured to intercept data derived by a computer-hosted database management system from a database,
      wherein the data are intercepted when the data are found within a data stream created by the database management system for delivery to a computer-hosted application, and
      wherein the intercepted data are in a non-tabular format; and
   a masking engine configured to
      create a tabular representation of the intercepted data, and
      mask any of the data in accordance with a masking policy that specifies which of the data in the tabular representation of the intercepted data are to be masked if a masking condition is met, wherein the masking condition references the tabular representation of the intercepted data using a tabular positional reference that refers to any of a row and a column of the tabular representation of the intercepted data.

7. The system according to claim 6 wherein the database monitoring agent configured to intercept the data
   a) after the data are derived from the database and
   b) before the data are provided to a recipient.

8. The system according to claim 7 wherein the database monitoring agent configured to intercept the data on a computer that derives the data from the database.

9. The system according to claim 7 wherein the data are derived from the database in response to a query.

10. The system of claim 6 wherein the database monitoring agent and the masking engine are implemented in any of
    a) computer hardware, and
    b) computer software embodied in a non-transitory, computer-readable medium.

11. A computer program product for dynamic data masking, the computer program product comprising:
    a non-transitory, computer-readable storage medium; and
    computer-readable program code embodied in the storage medium, wherein the computer-readable program code is configured to
       intercept data derived by a computer-hosted database management system from a database,
          wherein the data are intercepted when the data are found within a data stream created by the database management system for delivery to a computer-hosted application, and
          wherein the intercepted data are in a non-tabular format; and create a tabular representation of the intercepted data, and mask any of the data in accordance with a masking policy that specifies which of the data in the tabular representation of the intercepted data are to be masked if a masking condition is met, wherein the masking condition references the tabular representation of the intercepted data using a tabular positional reference that refers to any of a row and a column of the tabular representation of the intercepted data.

12. The computer program product according to claim 11 wherein the computer-readable program code is configured to intercept the data
 a) after the data are derived from the database and
 b) before the data are provided to a recipient.

13. The computer program product according to claim 12 wherein the computer-readable program code is configured to intercept the data on a computer that derives the data from the database.

14. The computer program product according to claim 12 wherein the data are derived from the database in response to a query.

* * * * *